United States Patent
Seitz et al.

(10) Patent No.: US 6,530,301 B1
(45) Date of Patent: Mar. 11, 2003

(54) METHOD OF AND APPARATUS FOR HANDLING TANDEM CONTAINERS

(75) Inventors: Michael D. Seitz, Toledo, OH (US); James E. Gerdeman, Sylvania, OH (US)

(73) Assignee: Owens-Brockway Plastic Products Inc., Toledo, OH (US)

( * ) Notice: Subject to any disclaimer, the term of this patent is extended or adjusted under 35 U.S.C. 154(b) by 0 days.

(21) Appl. No.: 09/902,046

(22) Filed: Jul. 10, 2001

(51) Int. Cl.[7] .............................................. B26D 7/06
(52) U.S. Cl. ....................................................... 83/23
(58) Field of Search .......................... 83/23; 82/46, 47; 264/509, 543; 408/1 R; 198/689.1

(56) References Cited

U.S. PATENT DOCUMENTS

| | | | | |
|---|---|---|---|---|
| 3,432,586 A | * | 3/1969 | Stenger | 264/527 |
| 3,862,698 A | * | 1/1975 | Hafele | 428/542.8 |
| 3,894,454 A | * | 7/1975 | Reilly et al. | 82/47 |
| 4,445,406 A | * | 5/1984 | Thatcher | |
| 5,960,933 A | * | 10/1999 | Albrecht | 198/689.1 |
| 6,171,542 B1 | * | 1/2001 | Struble | |

* cited by examiner

Primary Examiner—Paul T. Sewell
Assistant Examiner—M. Chambers (57) ABSTRACT

Apparatus for, and method of, conveying tandem thermoplastic containers from a molding machine to a tail removal station, the tandem containers being positioned with their axes extending horizontally but possibly out of parallel with one another and with their ends possibly out of alignment with one another. The apparatus includes a spaced pair of synchronously driven endless conveyors that convey tandem containers to a downwardly inclined ramp, the ramp having a wedge on its tandem supporting surface that engages outwardly projecting beads on each of the containers of the tandem to orient the tandems with their ends parallel, the downwardly inclined ramp also serving to orient the tandems with their axes parallel. The apparatus also has a spaced pair of horizontally extending and synchronously driven worm gears for spacing the tandems and advancing them toward the tail removal station, the worm gears advancing the tandems over a ramp that engages the tail of each tandem to position all tails horizontally for proper severing.

7 Claims, 9 Drawing Sheets

METHOD OF AND APPARATUS FOR HANDLING TANDEM CONTAINERS

FIELD OF THE INVENTION

This invention relates to a method of and apparatus for handling thermoplastic containers that are formed in tandem, that is, open end to open end, after the tandem containers are discharged from a blow molding machine.

BACKGROUND OF THE INVENTION

Small plastic containers, for example, containers designed for packaging 8 fl. oz. or less of a beverage, are advantageously produced two at a time; in tandem, with the containers joined open end to open end. Typically, the tandem containers of such character are discharged at a fairly high rate from a blow molding machine, for example, a blow molding machine of the wheel type, as described in U.S. Pat. No. 6,171,542 (Struble), with the axes of successive tandem containers desirably extending horizontally and generally parallel to one another, and with opposed ends of the tandems in alignment with one another. However, at the time of the discharge of the tandem containers from the blow molding machine, the axes of such tandem containers are not always precisely parallel to one another and the opposed ends of a tandem are often out of alignment with those of other tandems; further, the tandems are often circumferentially misaligned with one another.

Tandem containers, as heretofore described, must undergo additional processing steps after being discharged from a blow molding machine, and these processing steps include trimming of the "tail" from an end of one of the containers, severing the containers of the tandem from one another, and trimming the sealing rims of the containers. All these steps require that the tandems be accurately aligned on an end to end basis. Further, because the tail on one of the containers of the tandem extends on a diametral line that is formed by parting lines between halves of the molds in which the tandems are formed, it is necessary that the tandems be accurately circumferentially positioned prior to the trimming of the tail from an end of each of the tandems.

BRIEF SUMMARY OF THE INVENTION

According to the present invention, there is provided a method of, and an apparatus for, accurately aligning successive tandem thermoplastic containers being discharged from a blow molding machine with their longitudinal central axis extending horizontally, each of the tandem containers being discharged along an axis extending normally to the desired orientation of the longitudinal central axes of the tandem containers. Each of the tandem containers, as described, is made up of a pair of individual containers that are joined open end to open end, and each of the individual containers has an outwardly projecting annular support bead, near its open end, to support the container during filling and capping. The successive tandem containers are conveyed from the blow molding machine in a generally horizontal direction on upwardly facing suction cups on a take-out conveyor, and there is some tendency for individual tandem containers to partly rotate and there is some tendency for individual tandem containers to partly rotate during this step, which can lead to variations in the orientation of diametral tails on an end of the tandem containers, from tandem to tandem.

The tandem containers on the take-out conveyor are transferred to a downwardly inclined chute. The chute has a wedge that is positioned with a narrow end near an inlet end of the chute and a wider end near an outlet end of the chute, and the opposed edges of the wedge are positioned to engage the interiors of the support beads on the containers of the tandem. Thus, as the tandems move down the chute, the edges of the wedge bring tandems into positions where their opposed ends are aligned, even if not properly aligned at the inlet to the inclined chute. Further, such tandem containers are permitted to contact one another in the inclined chute, and this is effective to align their longitudinal central axes parallel to one another, even if not properly aligned at the inlet to the inclined chute.

After exiting the inclined chute, the successive tandems, which are now positioned with their longitudinal central axes extending parallel to each other and with their opposed ends in alignment, are transferred to a spin trimmer along a flat plate by a rotary worm gear mechanism, specifically, a spaced apart pair of parallel and synchronously driven like worm gears, that separates successive tandems by a distance equal to spaces between successive helixes of the worm gear(s). Each such tandem passes over a ridge on the flat plate, and the ridge engages a thin key that extends axially from an end of one of the containers of each of the tandems along a diameter of the tandem, the tail of that container extending from the key and parallel thereto. The ridge engages the key to circumferentially position the tandem so that the tail at its end is properly positioned to be severed from the tandem.

Accordingly, it is an object of the present invention to provide an improved method of, and an apparatus for, handling successive freshly-molded tandem thermoplastic containers to properly position the tandem containers for further processing.

More particularly, it is an object of the present invention to provide a method of, and an apparatus for, the foregoing character to overcome any out of parallel condition of the longitudinal central axes of successive tandem containers, and to correct any out of alignment condition between opposed ends of successive tandem containers.

It is also an object of the present invention to provide a method of, and an apparatus for, the foregoing character to accurately circumferentially orient each successive tandem container so that a linear tail extending diametrically from an end of one of the containers of each of the tandem is properly oriented for removal of the tails from the tandem containers.

For a further understanding of the present invention and the objects thereof, attention is directed to the drawing and the following brief description thereof, to the detailed description of the preferred embodiment and to the appended claims.

DETAILED DESCRIPTION OF THE INVENTION

Figure 1:
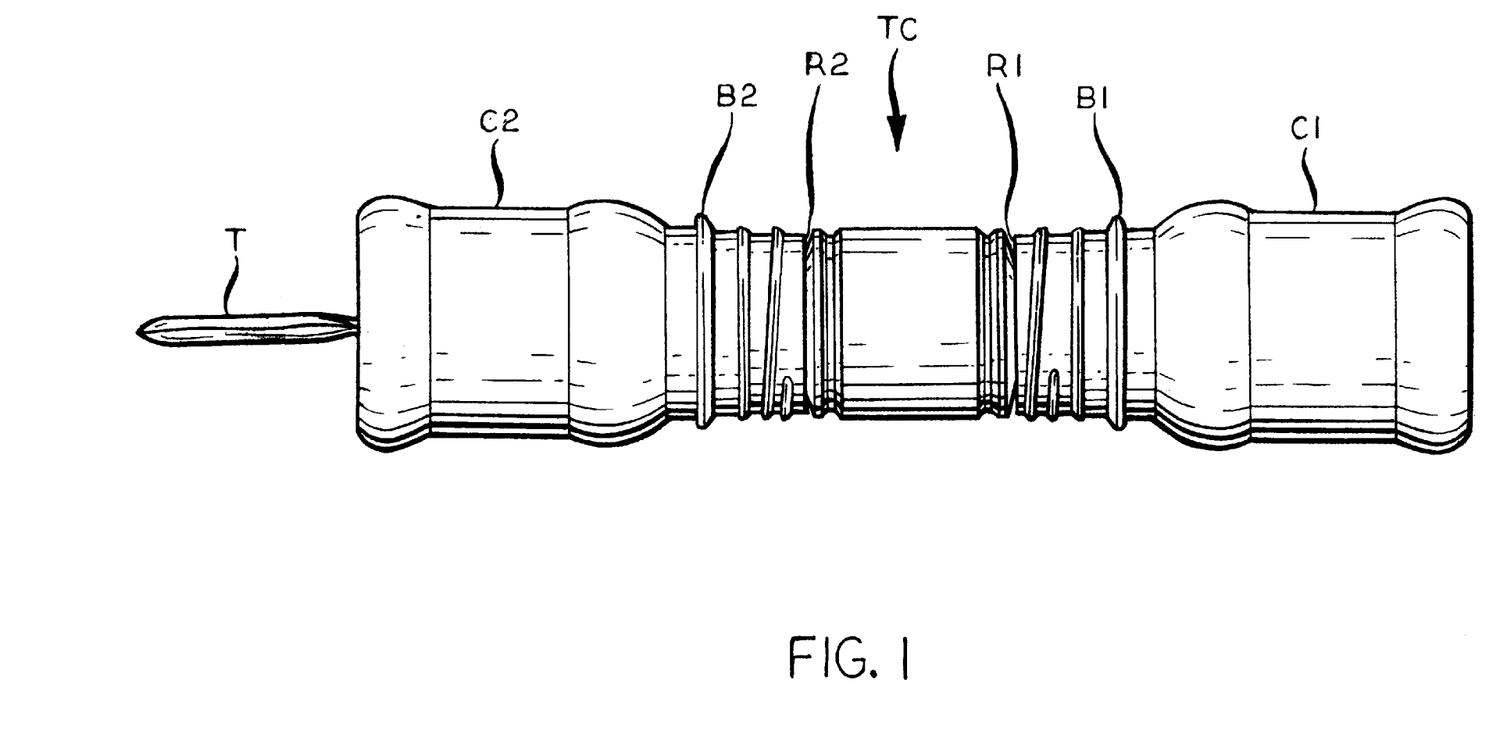
FIG. 1 is an elevation view of a pair of thermoplastic containers that have been molded in tandem with open ends facing toward one another, and it is to the handling of such tandem containers that the method and apparatus of the present invention is directed.

A thermoplastic tandem container for handling by the apparatus of FIGS. 2–9 is generally identified by reference character TC in FIG. 1, and the tandem container TC is made up of first and second thermoplastic containers C1, C2, whose open ends in the tandem container TC are joined to each other. Tandem containers like the tandem container TC are produced in succession in substantial quantity by a blow molding machine, such as a blow molding machine of the wheel type, and such tandem containers are discharged from the blow molding machine with the longitudinal central axes of the tandem containers extending generally horizontally and along a generally horizontally extending path of travel that extends normally of the longitudinal central axes of the tandem containers. The containers C1, C2 have rims R1, R2, respectively, and radially outwardly projecting beads, B1, B2, respectively, positioned inwardly of the rims, R1, R2, but close to the rims. The beads, B1, B2, are used to support the containers C1, C2, respectively, during filling and capping, after the containers C1, C2 have been severed from the tandem container TC. One of the containers C1, C2 shown as the container C2, has a tail T projecting outwardly therefrom, the tail T being formed along a diameter of the container C2 along a parting line between the mold halves of the mold set in which the tandem container TC was formed.

Figure 2:
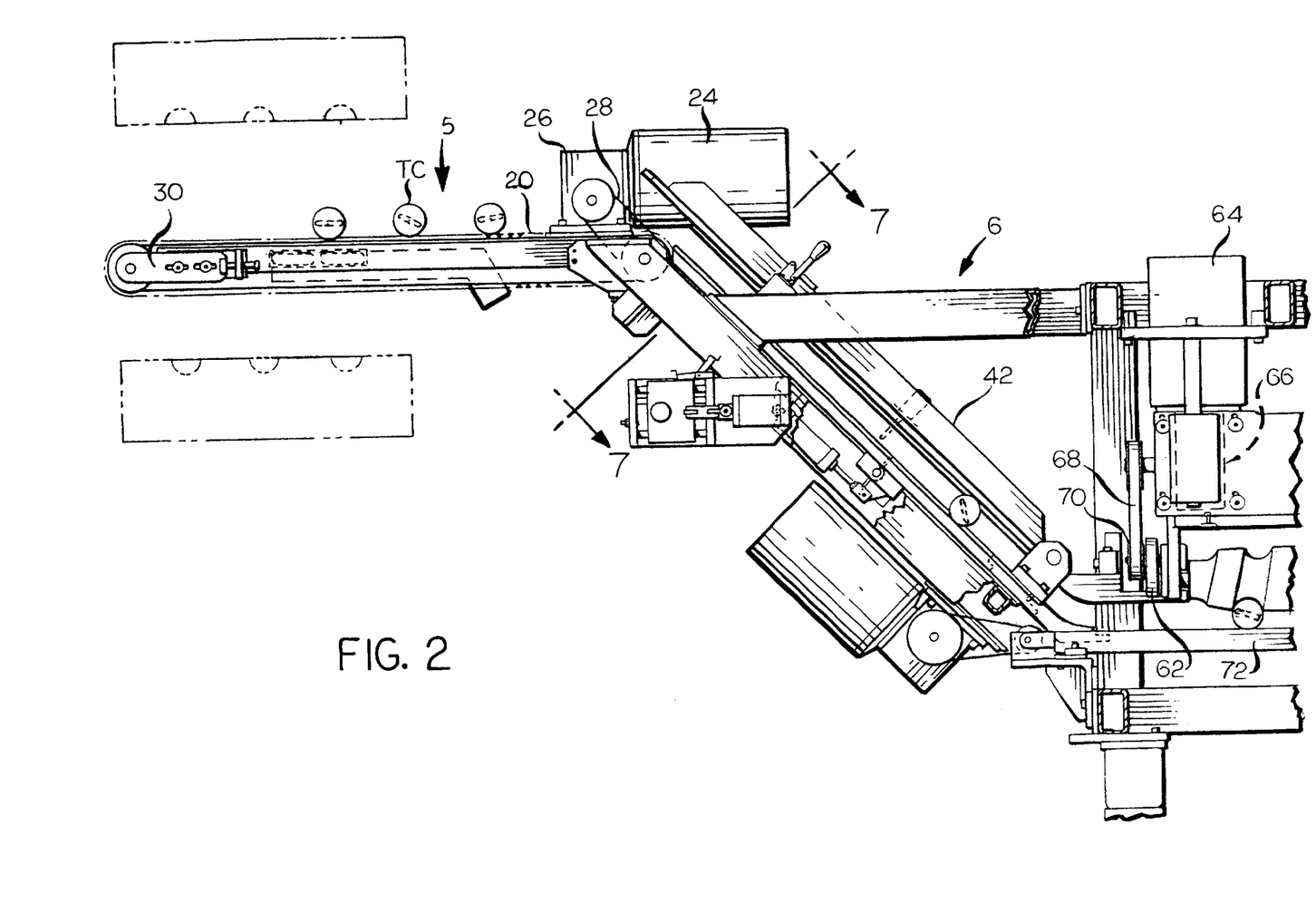
FIG. 2 is an elevation view of an end of apparatus for handling tandem containers according to FIG. 1.
Figure 3:
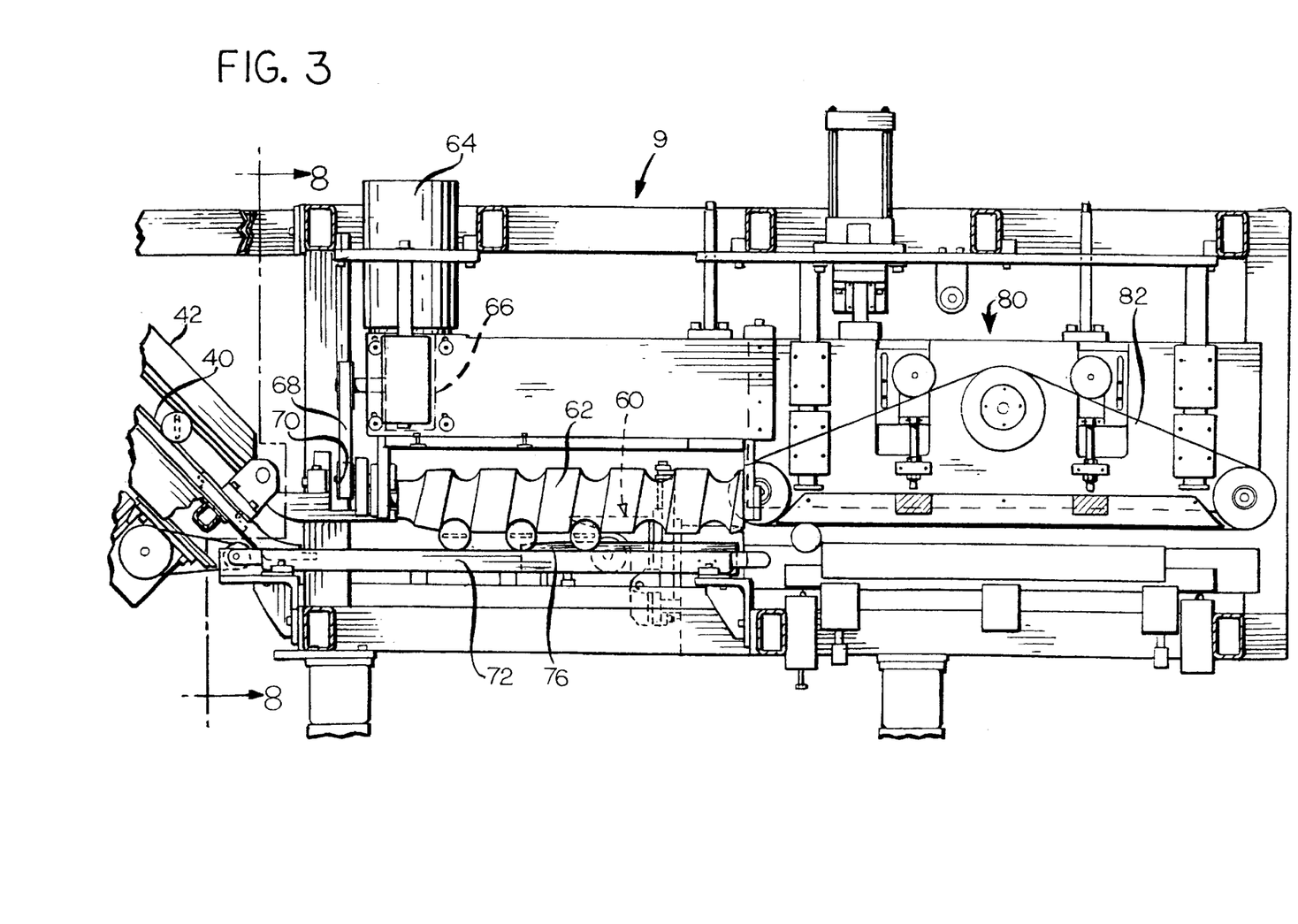
FIG. 3 is an elevation view of a central portion of an apparatus according to the present invention.
Figure 4:
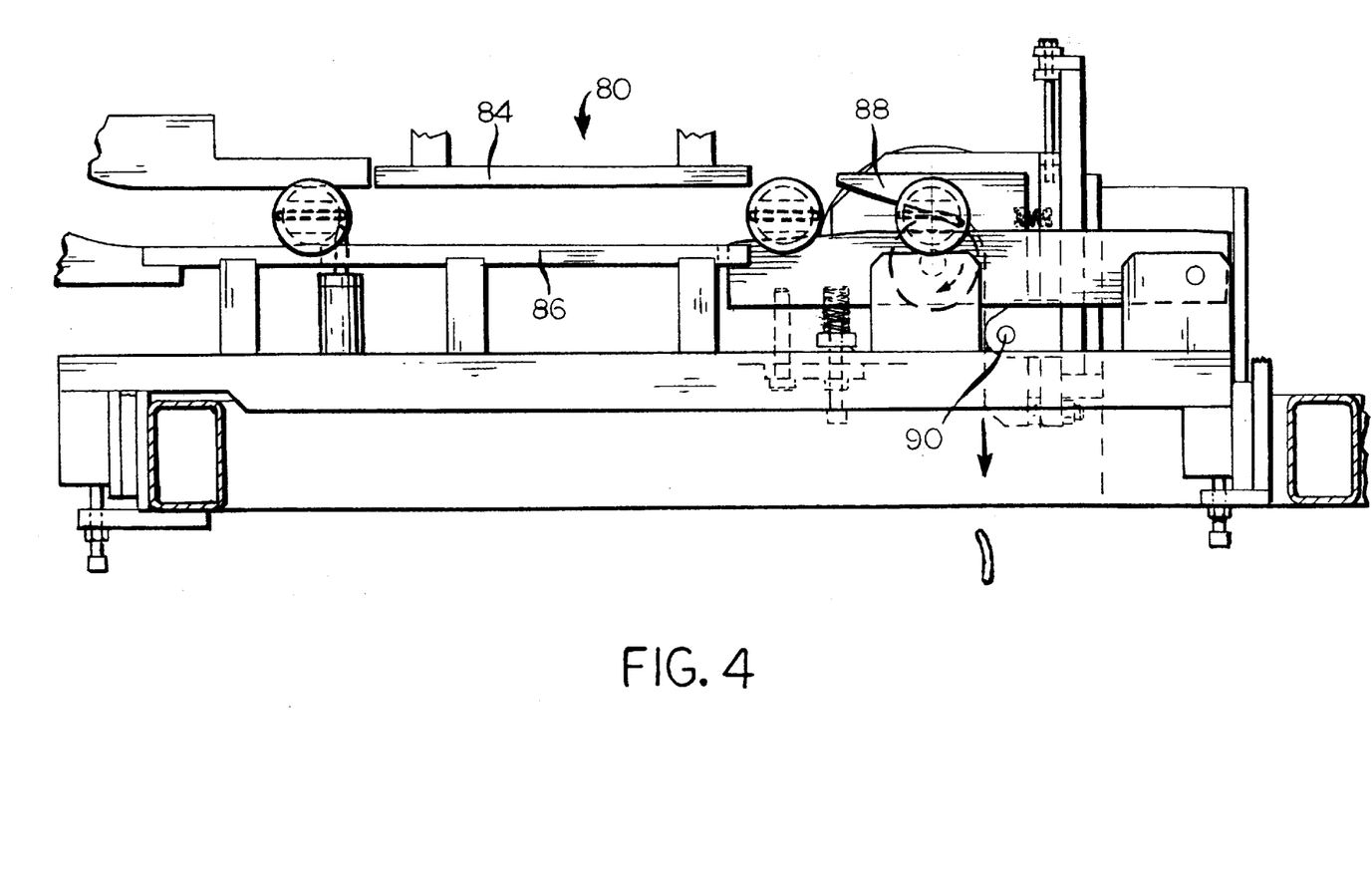
FIG. 4 is an elevation view of an opposed end of an apparatus according to the present invention, FIGS. 2, 3 and 4, together, constituting an elevation view of the entire apparatus.
Figure 5:
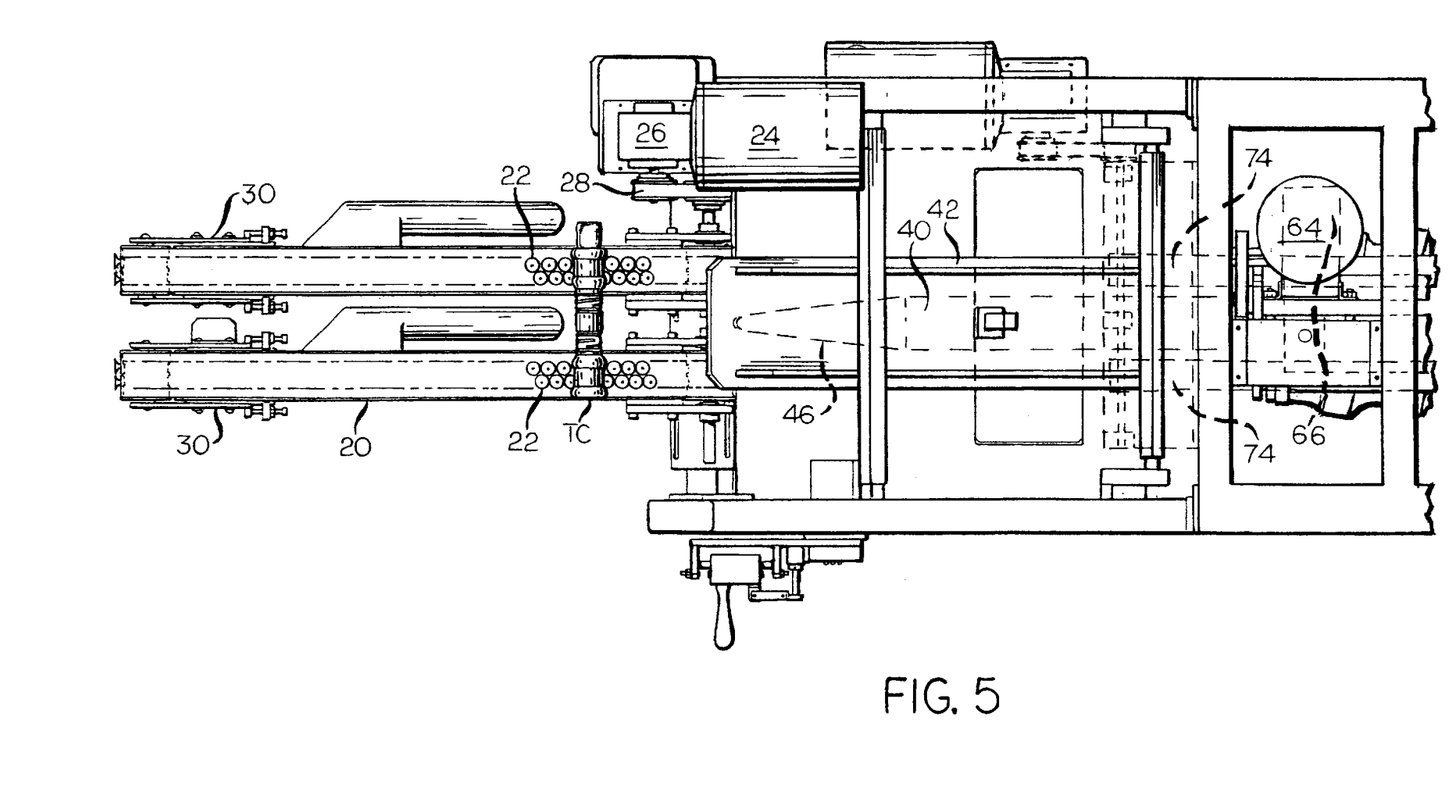
FIG. 5 is a plan view of a portion of the apparatus of FIG. 2 taken in the direction of the arrow 5 in FIG. 2.

Apparatus for handling a succession of like tandem containers, like the tandem container TC, is illustrated, from left to right, in FIGS. 2, 3 and 4, and such apparatus has a generally horizontally extending conveyor assembly 20, which is preferably made up of a spaced apart pair of like, individual endless containers, as shown in FIG. 5. Each conveyor in the conveyor assembly 20 has a plurality of suction cups 22 extending upwardly from an upper flight of such conveyor, and tandem containers like the tandem container TC are retained on the conveyor assembly 20 by the suction cups 22 in fixed positions upon discharge of the tandem containers from mold halves of a mold set in which the tandem containers were formed, the halves of a mold set being shown in phantom in FIG. 1. The conveyors of the conveyor assembly 20 are driven in endless paths, an upper flight of each moving from left to right in the orientation shown in FIG. 1, by an electric motor 24 operating through a speed reducer 26, which drives an endless belt (or chain) 28. Tension in each of the conveyors of the conveyor assembly 20 is adjusted by a take-up assembly 30 at the inlet end of each such conveyor.

Figure 6:
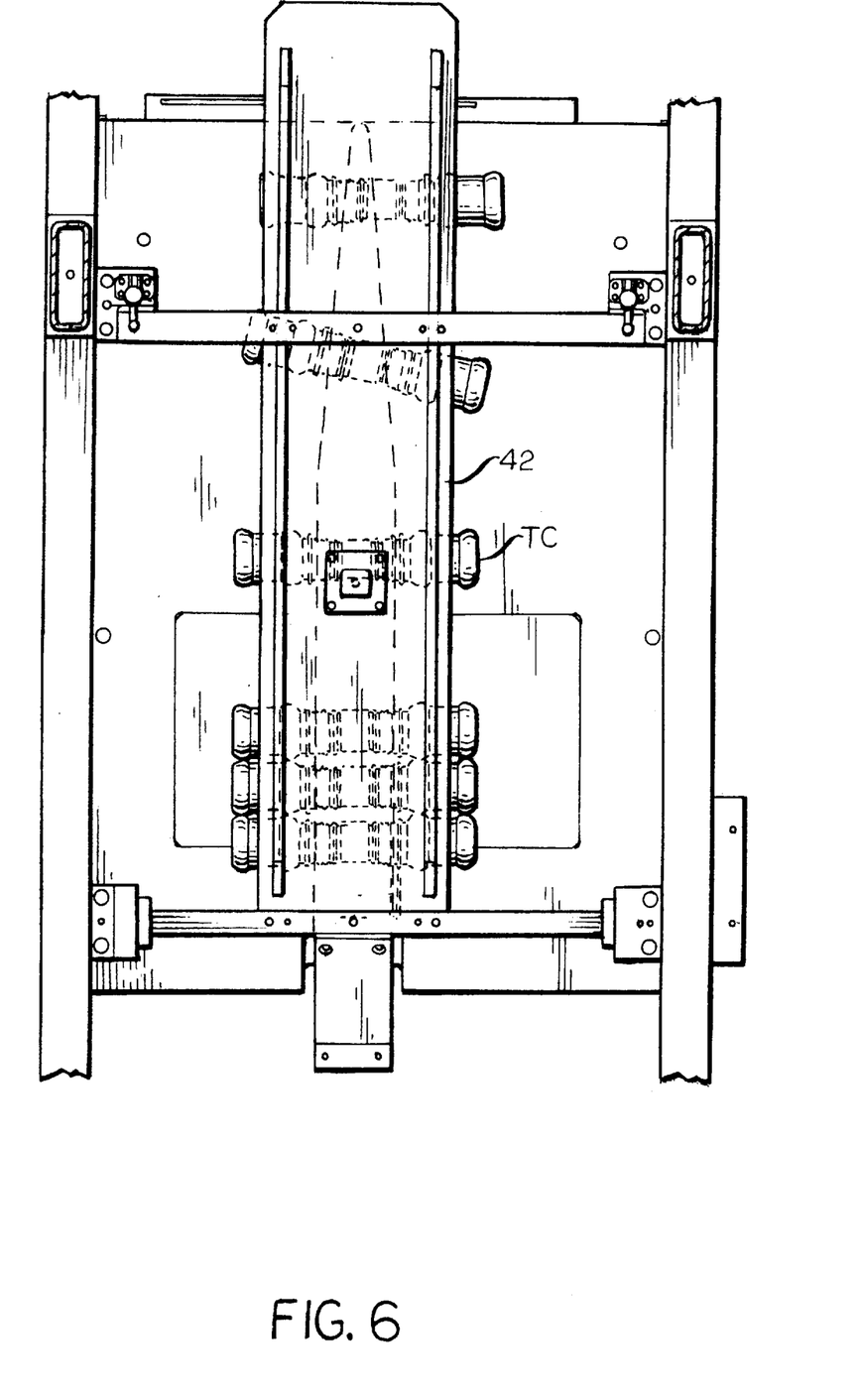
FIG. 6 is a plan view of a portion of the apparatus of FIG. 2 taken in the direction of the arrow 6 in FIG. 2.
Figure 7:
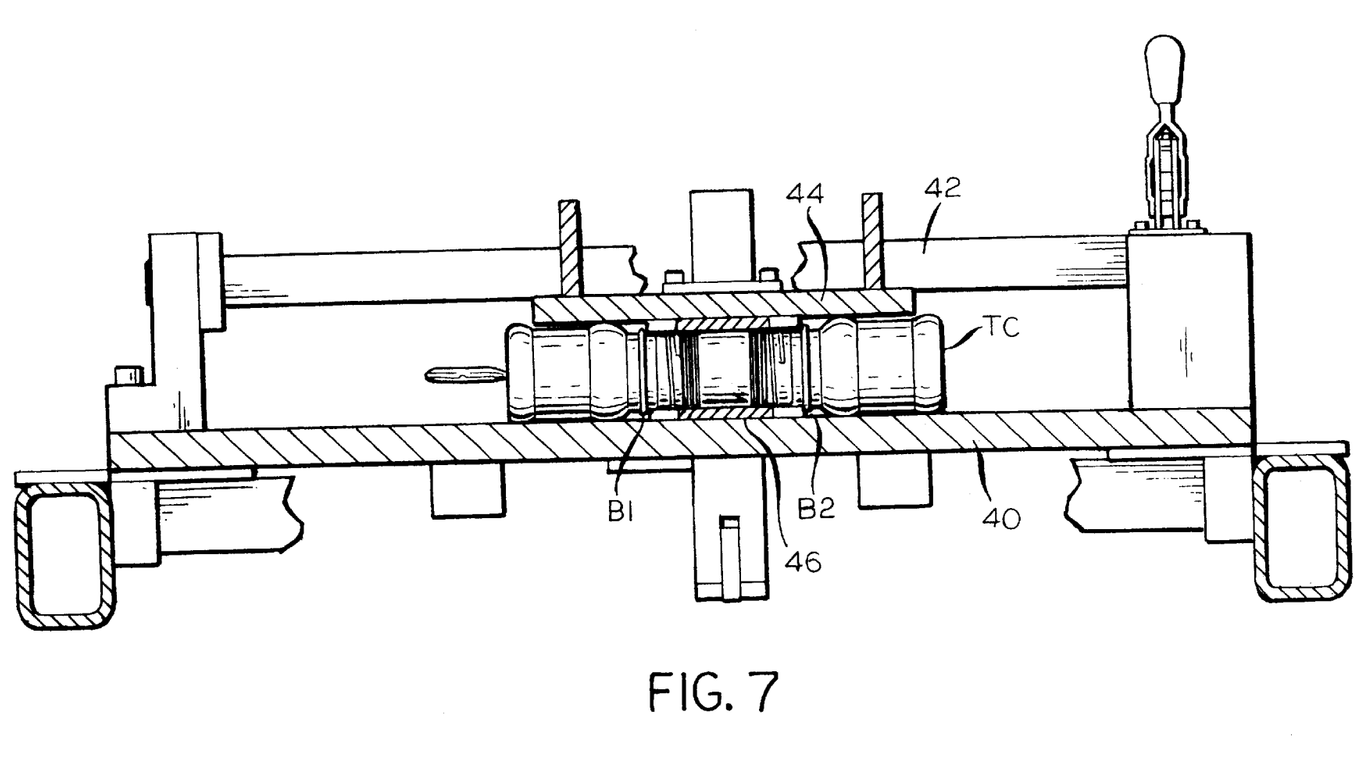
FIG. 7 is a sectional view taken on line 7—7 of FIG. 2.
Figure 8:
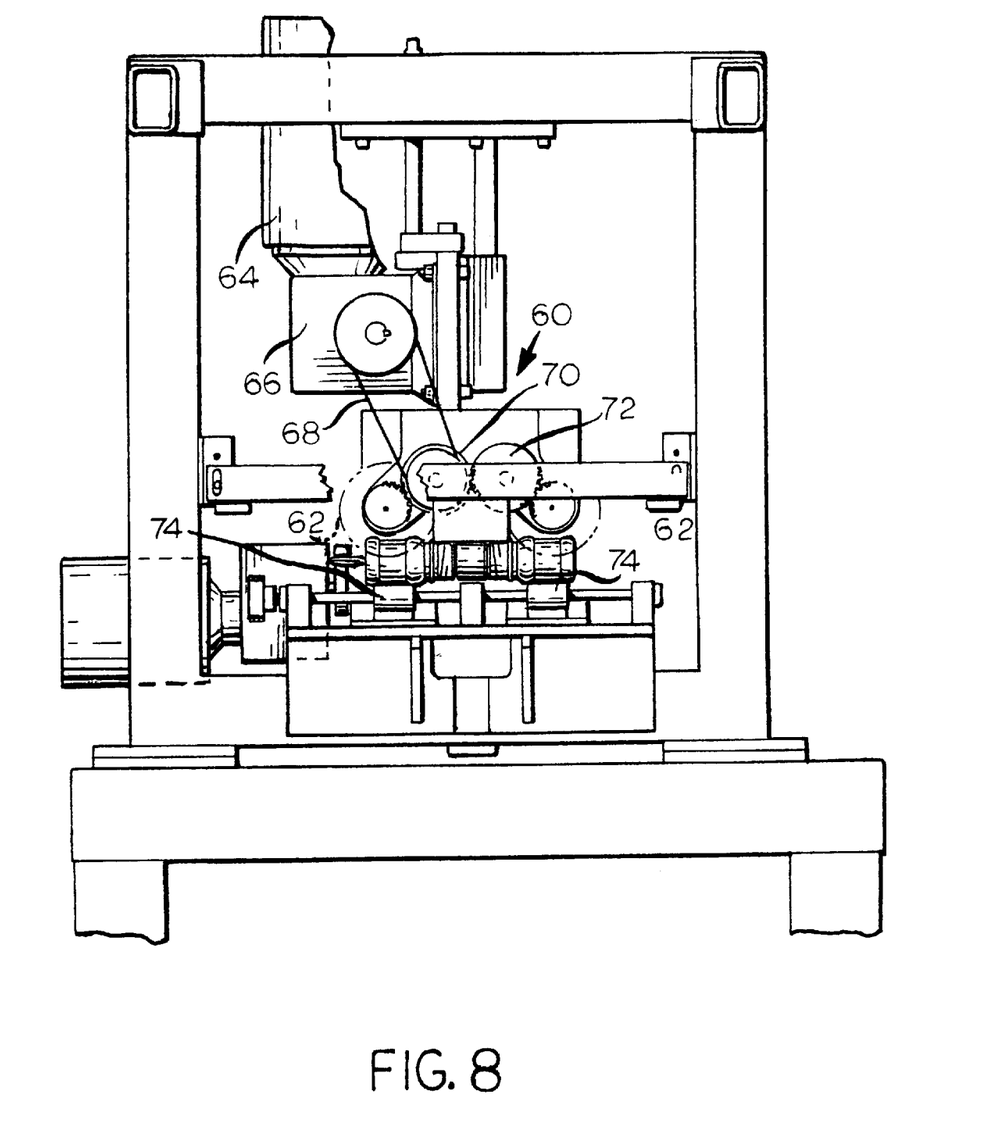
FIG. 8 is a sectional view taken on line 8—8 of FIG. 3.
Figure 9:
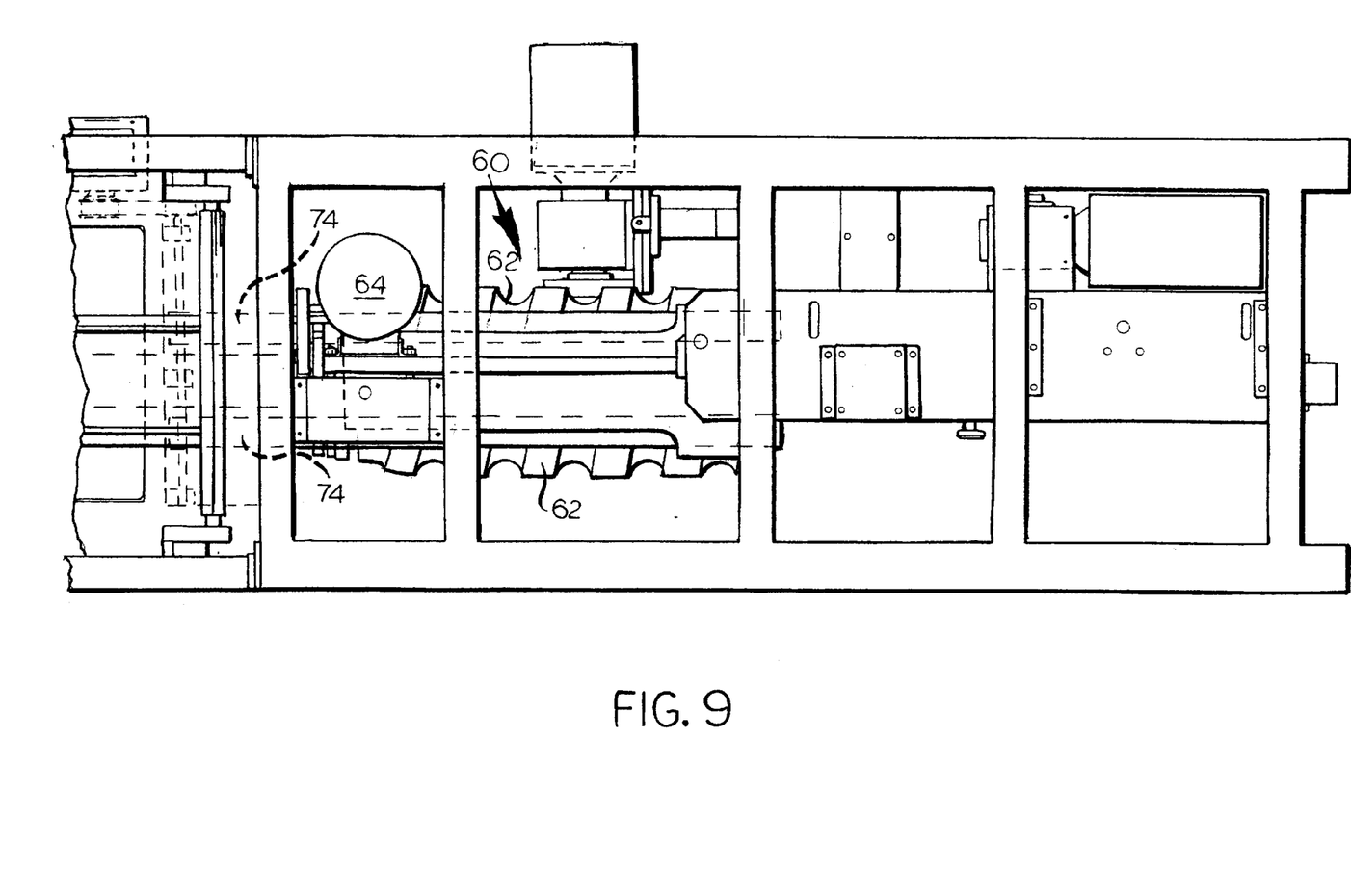
FIG. 9 is a plan view of a portion of the apparatus of FIG. 3 taken in the direction of the arrow 9 in FIG. 3.

The tandem containers on the conveyor assembly 20 are spaced apart, as shown in FIG. 1, and their longitudinal central axes may or may not extend parallel to each other. Further, the opposed ends of the tandem containers on conveyor assembly 20 may or may not be in alignment with one another. These conditions are illustrated in FIG. 6. To ensure that the longitudinal central axes of the tandem containers are eventually aligned parallel to each other, and that the opposed ends of the tandem conveyors are eventually aligned with one another, the tandem containers are discharged from the conveyor assembly 20 to a downwardly extending inclined plate 40 of a downwardly inclined chute assembly 42, which also has an upper plate 44 spaced above the plate 42 to maintain the tandem containers against the plate 40. The plate 40 has a wedge 46 positioned on its upper surface with a narrow end of the wedge 46 extending toward the conveyor assembly 20; likewise, the upper plate 44 also has a wedge 48 which is positioned on the lower surface of the upper plate 44 with the narrow end of the wedge 48 extending toward the conveyor assembly 20. The side edges of the wedges 46, 48 engage the interiors of the beads, B1, B2 of each tandem container TC, at least eventually as the tandem container TC progresses along the wedges 46, 48 toward the wider ends of such wedges, and this ensures that opposed ends of successive tandem containers are aligned, even if not so aligned when the tandem containers enter the chute assembly 42. Further, successive tandem containers are removed from the chute assembly 42 by a worm gear assembly, indicated generally by reference numeral 60, FIGS. 3 and 9. The worm gear assembly 60 controls the rate at which tandem containers are removed from the chute assembly 42, to ensure that tandem containers must contact each other at least at the bottom of the chute assembly 42 before removal of the tandem containers from the chute assembly 42, and this is effective to bring the longitudinal central axes of the tandem containers into parallel orientation, even if such orientation is not brought about by the wedges 46, 48.

The worm gear assembly 60 comprises a spaced apart, horizontally extending pair of parallel helically extending worms 62, which are driven by a motor 64, that acts through a speed reducer 66. The speed reducer 66 has a belt (or chain) drive 68 that drives one of the worms 62, shown as the one at the left in FIG. 8, and a pulley 70 of that worm has gear teeth that engage a pulley 72 on the other worm to ensure that both pulleys are synchronously driven to advance tandem containers along a path of travel that extends normally of the parallel, longitudinal central axes of the tandem containers. The tandem containers are supported on plates 74 of the worm gear assembly 60 as they move through the worm gear assembly 60, from left to right as shown in FIG. 3. The plate 74 that is positioned adjacent to the tail T of each tandem container TC that passes through the worm gear assembly 60 is provided with a ramp 76, and the ramp 76 has a downwardly inclined front portion. The ramp 76 engages the tail T of each tandem container TC that passes over it, or a flat or a key from which the tail extends, to ensure that each such tail T is horizontally positioned before the tandem containers reach a tail severing assembly 80, FIGS. 3 and 4, for removal of the tail T from each tandem container TC.

The tail removal assembly 80 generally conforms to the apparatus described in U.S. Pat. No. 4,445,406 (Thatcher), the disclosure of which is incorporated by reference herein. The tail removal assembly 80 is provided with an endless belt 82 a lower horizontal flight of which engages tops of a series of tandem containers TC. The belt 82 is powered so that its lower flight moves from left to right, in the arrangement shown in FIG. 3, to move the tandem containers TC between spaced apart, horizontally extending guides 84 and 86, as shown in FIG. 4, toward a heated cutoff knife 88, as also shown in FIG. 4, which is positioned to sever the tail T from each tandem container as it approaches the knife. The knife is pivoted about an axis 90 so that it oscillates between its cutting position, which is shown in FIG. 4, and a retracted position, and this permits the knife to be advancing toward the next tandem container TC to have a tail severed from it to increase the effectiveness of the cutting action by increasing the relative velocity between the cutting knife and the tandem container. Severed tails from the tandem containers TC are dropped vertically from the apparatus 10, as shown in FIG. 4.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. Apparatus for aligning tandem blown bottles coming out of a blow molding machine, each tandem blown bottle having a pair of blown bottles joined open end to open end, each blown bottle having a bead projecting radially outwardly from a location near an open end of the bottle, the apparatus comprising:

means for conveying tandem blown bottles along a path that extends generally perpendicular to axes of the tandem blown bottles, in succession, from a blow molding machine with the tandem blown bottles being positioned on the means for conveying possibly with the exes of the tandem blown bottles misaligned, and possibly with the ends of the tandem blown bottles misaligned; and downwardly extending inclined means for transferring tandem blow bottles, in succession, from the means for conveying, the downwardly extending inclined means for transferring having first and second edges tapered in a direction extending parallel to the downwardly extending inclined means for transferring and positioned to engage the beads of the blown bottles, respectively, to align the ends of the tandem blow bottles, the downwardly extending inclined means for transferring also serving to align the axes of successive tandem blown bottles to be substantially parallel to each other.

2. Apparatus according to claim 1 wherein at least one blown bottle of each tandem has a closed end with a flat extending outwardly from a central portion of the closed end and a tail extending outwardly from the flat, and wherein the apparatus for aligning further comprises:

generally horizontally extending conveying means for conveying tandem blown bottles from the downwardly extending inclined means for transferring, said generally horizontally extending conveying means having wedge means for engaging the flat of the at least one blown bottle of each tandem as the tandem blown bottles are conveyed by the generally horizontally extending conveying means to circumferentially orient the tandem blown bottles and thereby properly orient the tails to be removed by a tail removal means.

3. Apparatus according to claim 1 and further comprising:

means for successively severing tails from tandem blown bottles; and worm gear means for separating successive tandem containers and for advancing successive containers from said downwardly inclined means toward said means for severing.

4. Apparatus according to claim 3 and further comprising:

a ramp with a downwardly inclined leading portion for engaging successive tandem containers as they are advanced by said worm gear means to horizontally position the tail of each tandem container before it reaches the means for severing.

5. Apparatus according to claim 4 wherein said worm gear means comprises:

a first worm gear, said first worm gear extending horizontally;

a second worm gear, said second worm gear extending horizontally and parallel to said first worm gear and being spaced from said first worm gear; and means for synchronously driving said first worm gear and said second worm gear.

6. Apparatus according to claim 1 wherein said means for conveying comprises:

an endless conveyor having a horizontally extending upper flight;

a plurality of suction cups on said endless conveyor, said suction cups extending upwardly from the upper flight of the endless conveyor to support tandem containers introduced into the apparatus from a blow molding machine with minimal relative movement between tandem containers on the upper flight of the conveyor and the upper flight of the conveyor; and means for driving said endless conveyor to advance the upper flight of said endless conveyor toward said downwardly inclined means.

7. Apparatus for aligning tandem blown bottles coming out of a blow molding machine, each tandem blown bottle having a pair of blown bottles joined open end to open end, each blown bottle having a bead protecting radially outwardly from a location near an open end of the bottle, the apparatus comprising:

means for conveying tandem blown bottles, in succession, from a blow molding machine with the tandem blown bottles being positioned on the means for conveying possibly with axes of the tandem blown bottles misaligned, and possibly with the ends of the tandem blown bottles misaligned; and downwardly extending inclined means for transferring tandem blown bottles, in succession, from the means for conveying, the downwardly extending inclined means for transferring having first and second edges tapered in a direction extending parallel to the downwardly extending inclined means for transferring and positioned to engage the beads of the blown bottles, respectively, to align the ends of the tandem blown bottles, the downwardly extending inclined means for transferring also serving to align the axes of successive tandem blown bottles to be substantially parallel to each other, wherein said means for conveying comprises:

a first end less conveyor having a horizontally extending upper flight;

a first plurality of suction cups on said first endless conveyor, said first plurality of suction cups extending upwardly from the upper flight of said first endless conveyor to partly support tandem containers introduced into the apparatus from a blow molding machine with minimal relative movement between tandem containers on the upper flight of said first endless conveyor and the upper flight of said first endless conveyor;

a second endless conveyor having a horizontally extending upper flight, said second endless conveyor being spaced from said first endless conveyor;

a second plurality of suction cups on said second endless conveyor, said second plurality of suction cups extending upwardly from the upper flight of said second endless conveyor to partly support the tandem containers with minimal relative movement between tandem containers on the upper flight of said second endless conveyor and the upper flight of the second endless conveyor; and means for synchronously driving said first endless conveyor and said second endless conveyor.

* * * * *